US012717488B2

(12) United States Patent
Erickson et al.

(10) Patent No.: US 12,717,488 B2
(45) Date of Patent: Aug. 25, 2026

(54) DEVICE ASSISTED COLD PAGE TRACKING

(71) Applicant: Rambus Inc., San Jose, CA (US)

(72) Inventors: Evan Lawrence Erickson, Chapel Hill, NC (US); Taeksang Song, San Jose, CA (US)

(73) Assignee: RAMBUS INC., San Jose, CA (US)

( * ) Notice: Subject to any disclaimer, the term of this patent is extended or adjusted under 35 U.S.C. 154(b) by 8 days.

(21) Appl. No.: 18/906,976

(22) Filed: Oct. 4, 2024

(65) Prior Publication Data

US 2025/0117138 A1 Apr. 10, 2025

Related U.S. Application Data

(60) Provisional application No. 63/542,851, filed on Oct. 6, 2023.

(51) Int. Cl.
*G06F 3/06* (2006.01)

(52) U.S. Cl.
CPC .......... *G06F 3/0613* (2013.01); *G06F 3/0656* (2013.01); *G06F 3/0673* (2013.01)

(58) Field of Classification Search
CPC ...... G05B 13/00–048; G05B 15/00–02; G05B 17/00–02; G06F 1/00–3296; G06F 3/00; G06F 3/06–0689; G06F 5/00–16; G06F 8/00–78; G06F 9/00–548; G06F 11/00–3696; G06F 12/00–16;
(Continued)

(56) References Cited

U.S. PATENT DOCUMENTS 7,609,564 B2 * 10/2009 Blum .................. G11C 16/102
365/189.011
9,146,867 B2 9/2015 Mogul et al.
(Continued)

FOREIGN PATENT DOCUMENTS

WO WO-2023-055463 A1 4/2023

OTHER PUBLICATIONS

Duraisamy, Padmapriya et al., "Towards an Adaptable Systems Architecture for Memory Tiering at Warehouse-Scale", ASPLOS '23, Mar. 25-29, 2023, Vancouver, BC, Canada, ACM ISBN 978-1-4503-9918-0/23/03, https://doi.org/10.1145/3582016.3582031. 15 pages.

*Primary Examiner* — Daniel C. Chappell
(74) *Attorney, Agent, or Firm* — Womble Bond Dickinson (US) LLP

(57) ABSTRACT

Disclosed are techniques for a memory buffer to track access to paged regions of a memory system at a configurable granularity finer than the size of the paged regions to provide more detailed statistics on memory access. The memory buffer may advertise its capabilities for fine-grained cold page tracking. The memory buffer may receive from the host information to configure a granularity of sub-regions of a paged region and a size of counters used to track access to the sub-regions. The memory buffer may track access requests to the sub-regions using the counters and to provide information on sub-region tracking to the host to identify individual hot or cold sub-regions. The host may make migration decisions for the paged regions with more granular information such as compaction of sub-regions to create a cold page or to treat each sub-region as a separately compressible entity to compress a mostly cold page.

19 Claims, 9 Drawing Sheets

(58) Field of Classification Search
CPC ... G06F 13/00–4295; G06F 15/00–825; G06F 16/00–986; G06F 18/00–41; G06F 17/00–40; G06F 21/00–88; G06F 2009/3883; G06F 2009/45562–45595; G06F 2015/761–768; G06F 2201/00–885; G06F 2206/00–20; G06F 2209/00–549; G06F 2211/00–902; G06F 2212/00–7211; G06F 2213/00–4004; G06F 2216/00–17; G06F 2221/00–2153; G06N 3/00–126; G06N 5/00–048; G06N 7/00–08; G06N 10/00; G06N 20/00–20; G06N 99/00–007; G06T 1/00–60; G06V 30/00–43; G11B 20/00–24; G11B 33/00–1493; G11C 11/00–5692; G11C 13/00–06; G11C 14/00–009; G11C 15/00–06; G11C 16/00–3495; G11C 17/00–18; G11C 2207/00–229; G11C 2216/00–30; H01L 25/00–50; H01L 2225/00–1094; H03M 7/00–707; H04L 9/00–38; H04L 12/00–66; H04L 41/00–5096; H04L 49/00–9094; H04L 61/00–59; H04L 67/00–75
See application file for complete search history.

(56) References Cited

U.S. PATENT DOCUMENTS 9,459,809 B1 * 10/2016 Chen ........................ G06F 3/061
10,303,375 B2 5/2019 Goel et al.
10,649,687 B2 5/2020 Hasbun et al.
10,963,183 B2 3/2021 Dinan et al.
11,237,981 B1 2/2022 Habusha et al.
11,403,011 B1 8/2022 Gunda et al.
11,663,138 B2 5/2023 Erickson et al.
11,914,494 B2 * 2/2024 Aiouaz ................. G06F 3/0619
12,511,053 B2 * 12/2025 Kim ...................... G06F 3/0614
2015/0347013 A1 * 12/2015 Mathur ............... G06F 12/0862 711/118
2021/0064272 A1 * 3/2021 Patel ................... G06F 12/0811
2021/0405913 A1 12/2021 Stonelake et al.
2022/0050619 A1 2/2022 Nakanishi et al.
2023/0093247 A1 3/2023 Kumar et al.

* cited by examiner

DEVICE ASSISTED COLD PAGE TRACKING

CROSS REFERENCE TO RELATED APPLICATIONS

This application claims the benefit of U.S. Provisional Application No. 63/542,851 filed on Oct. 6, 2023, the disclosure of which is incorporated herein by reference in its entirety.

TECHNICAL FIELD

This disclosure generally relates to technologies for management of pages of memory within a memory hierarchy. More specifically, the disclosure relates to systems and methods for memory modules to provide cold page tracking capabilities at a granularity finer than the page size of a memory region to assist a connected host in making migration decisions for a page identified as hot, warm, or cold.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
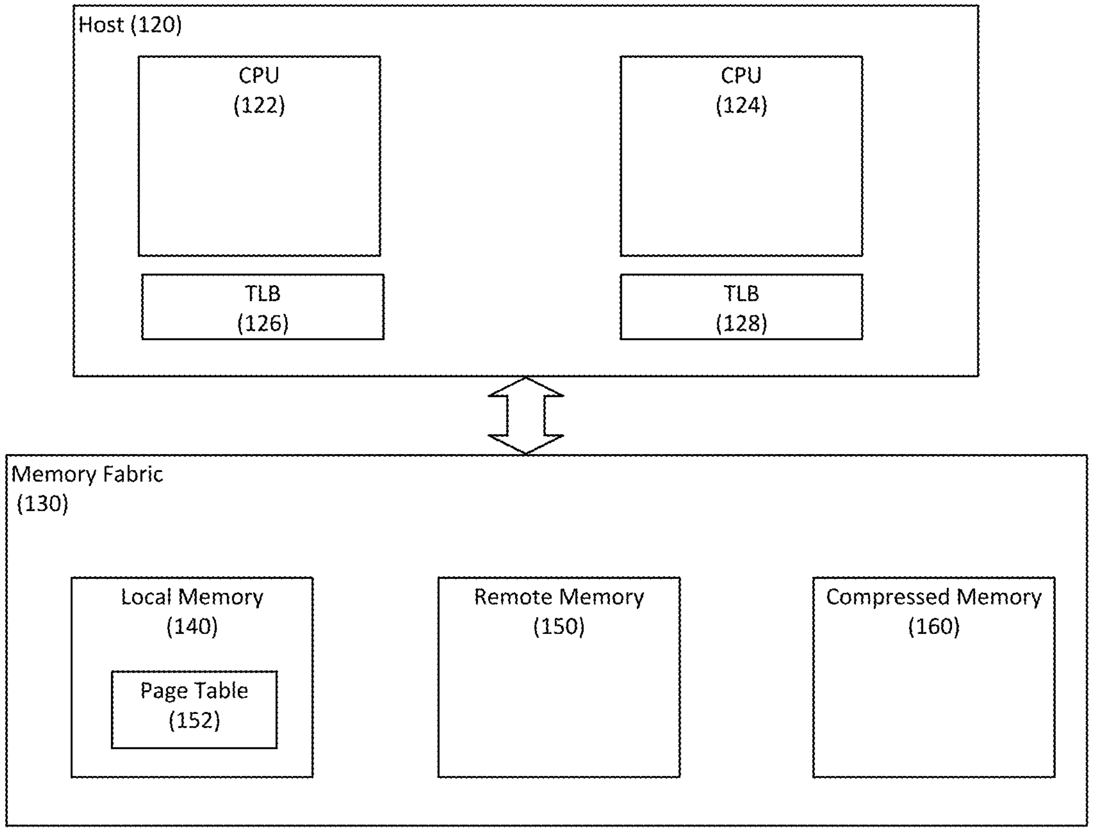
FIG. 1 depicts a processing system in which a host is connected to a memory space organized in a hierarchy of tiers with active tiering management of pages of the memory in accordance with one aspect of the present disclosure.

Examples of various aspects and variations of the subject technology are described herein and illustrated in the accompanying drawings. The following description is not intended to limit the invention to these embodiments, but rather to enable a person skilled in the art to make and use this invention.

Described are embodiments for a memory buffer to track access to paged regions of a memory system at a configurable granularity finer than the size of the paged regions to provide more detailed statistics on memory access to assist a connected host device in managing the tiering of the paged regions among a hierarchy of memories. To efficiently use memory capacity, reduce memory access latency, and increase data bandwidth, a memory space may be divided into a hierarchy of memories of various sizes, speed, capacities, etc. For example, a fast, smaller memory local to a host device may store more frequently accessed data by the host device while a remote larger memory with higher access latency may store less frequently accessed data. Tiering refers to the management of pages of memory within the hierarchy. Active tiering management involves the ability to discern "hot" pages that are frequently accessed from "cold" pages that have not been accessed in a certain time period so that the hot pages may be tiered in the memory with the lowest latency and the cold pages may be tiered in remote memory modules or compressed to free up more memory space.

A process running on a host device may have a page table containing entries for the pages of memory allocated to the process. The page table entries may provide the mapping between the virtual addresses generated by the host process and the physical address of the main memory where the pages referred by the logical addresses actually reside. A page table entry may contain other information such as a valid bit to indicate the validity of the entry, a dirty bit to indicate that data has been modified from the data in the storage, and an access bit to indicate that the page has been accessed by the host process since the last time the access bit was reset by the operating-system (OS). The access bit allows a cold page to be detected but does not provide information about how frequently the page was accessed, also referred to as discerning between "hot" pages from "warm" pages, unless the access bit is expanded into multiple bits. When a page is detected as cold, to efficiently use memory capacity and increase data bandwidth, the memory system may compress the data of an entire page or migrate the page data from the local memory to a remote memory so as to free up the memory of the cold page for other applications.

To facilitate the management of memory pages, ease the memory mapping between physical and logical memories, and to reduce the size of page tables, pages may be generally allocated with a large granularity. For example, a page may be 4 kilobyte (KB). If the memory allocated to a host process is big, a page table may contain a large number of page table entries (e.g., 1 million (M)). To reduce memory access latency, a high-speed cache such as a translation lookaside buffer (TLB) may store the most recently accessed page table entries. If a page table entry corresponding to a logical address from the host process is in the TLB (TLB hit), the physical address is formed. Otherwise, if a page table entry is not found in the TLB (TLB miss), the TLB may be updated to include the new page table entry. To increase memory performance further, the 4 KB granularity of the page may be enlarged. For example, a large page referred to as a huge-page may allow a single page table entry to represent a large collection of 4 KB pages, thereby increasing performance by reducing TLB misses and the depth of page table walks.

In one embodiment, a huge-page may be 2 megabytes (MB), or equivalent to 512 4 KB pages. In another embodiment, a huge-page may be 1 gigabyte (GB), or 256K 4 KB pages. However, a single huge-page may contain multiple objects of different characteristics with different frequencies of access by the host process. While huge-pages may increase memory performance by reducing access latency, a single access bit in the page table entry associated with a huge-page reduces the resolution for discerning whether the huge-page is hot, warm, or mostly cold compared to a page of smaller granularity. For example, if only a few objects in a huge-page are accessed by the host process, the access bit may indicate that the huge-page has been accessed at least once since the last time the access bit was reset. As a result, the entire huge-page remains in a high-performance tier, leading to inefficient memory utilization and increasing the challenge of migration and tiering of page data among the memory hierarchy. Alternatively, the huge-page may be broken into smaller pages, but that leads to a reduction in memory performance and defeats the purpose for increasing the granularity of the page.

To overcome the challenge of inefficient memory utilization resulting from a lack of visibility into how frequently data in a huge-page are accessed by a host process, a memory buffer may provide cold page tracking with a granularity that is configurable to be finer than that of the huge-page. In one embodiment, a memory buffer may track memory access to a 2 MB huge-page at a fine-grained resolution of 4 KB. A single bit or a configurable number of bits of a counter associated with each of 512 4 KB sub-pages of the 2 MB huge-page may track the memory access to the corresponding sub-pages. The host may select a portion of its allocated address range such as one or more huge-pages for fine-grained cold page tracking. In one embodiment, the host may configure the granularity of the sub-pages, the number of bits of the counters used to track each sub-page, and the location of the counters in the memory. The host may access the sub-page counters to read the counter values or to reset the counters, thereby controlling the cold page tracking intervals of the sub-pages. Assisted by the information from the counters provided by the memory buffer, the host may identify individual hot or cold objects within the huge-page rather than treating all objects therein as hot or cold so as to improve tiering decisions for the huge-page.

In one embodiment, the host or the memory buffer may analyze the access statistics from fine-grained cold page tracking of multiple huge-pages to determine how to move data in the huge-pages to create separate hot and cold huge-pages. For example, the memory buffer may determine how to re-arrange or swap sub-pages between two huge-pages in a compaction operation to create separate hot and cold huge-pages. In one embodiment, the memory buffer may request the host to approve a proposed swapping of 4 KB sub-pages suggested by the memory buffer. Once approved by the host, the memory buffer may swap the 4 KB sub-page locations in the device memory without requiring intervention from the host. In one embodiment, the cold huge-page created by the compaction operation may be compressed to free up memory.

In one embodiment, the memory buffer may treat sub-pages of a huge-page as separately compressible entities based on the access statistics from the sub-page tracking. The host may send a request to the memory buffer to compress a huge-page. The memory buffer may compress all cold sub-pages within the huge-page while leaving all warm or hot sub-pages uncompressed. The compressed huge-page may remain at the current memory tier or be migrated to a compressed region of the memory space. Advantageously, the host retains the performance benefit of huge-pages while a "mostly cold" huge-page may be compressed to optimize memory usage without adding significant latency to warm or hot sub-pages.

FIG. 1 depicts a processing system in which a host 120 is connected to a memory space organized in a hierarchy of tiers with active tiering management of pages of the memory in accordance with one aspect of the present disclosure. The host 120 may have two central processing units (CPUs) 122 and 124, such as those in a dual socket server. Tiering management involves managing the pages of memory within the memory hierarchy to ensure that the pages allocated to a process in the dual socket server is accessible through the same CPU that runs the process. Tiering management may also ensure efficient use of the memory hierarchy so that pages more frequently accessed by the CPUs 122/124 reside in the memory tier with the lowest latency and rarely accessed pages reside in the memory tier with the highest latency.

CPUs 122 and 124 may have translation lookaside buffers (TLBs) 126, and 128, respectively, for storing the page table entries most recently accessed by the respective CPUs. A memory fabric may contain various parts of a memory hierarchy such as a low-latency local memory 140 to store more frequency accessed page data, a higher-latency remote memory 150 to store uncompressed memory allocated to the CPU processes, and the highest-latency compressed memory 160 to store compressed page data so as to free up memory space in the remote memory 150 for other uses. The memory fabric 130 may be implemented in DRAM to store the code and data of the host 120 for access by the CPUs 122/124. In one embodiment, the local memory 140 or the remote memory 150 may be memory modules with memory buffer devices having SRAM or DRAM devices, such as a Compute Express Link (CXL) device used for high-speed CPU-to-memory connection. Any of these memory devices or modules may be referred to as a memory buffer.

A page table 152 residing either in local memory 140 or the remote memory 150 may contain entries for pages of memory allocated to CPU processes. The page table entries may provide the mapping between the virtual addresses generated by the processes and the physical address of the local memory 140 or the remote memory 150 or the compressed memory 160 where the pages referred by the virtual addresses actually reside. In one embodiment, the page table 152 may include multiple tables to provide the virtual-to-physical address mapping. For example, the page table 152 in the local memory 140 may map the virtual addresses of the processes to a host physical address. A second page table (not shown) or an address translation structure in the remote memory 150 may convert the host physical address to a device physical address used by the remote memory 150 or the compressed memory 160 to access the physical memory location where the target data resides. As will be explained, to monitor host access to the pages of the page table 152 at a finer granularity than the size of the page, the page table 152 or the second page table may be capable of tracking page access from the host process at the granularity of a sub-page. As mentioned, the entries in the page table 152 for the most recently accessed pages may be cached in the TLBs 126/128 to reduce the memory access latency. If there is a TLB miss, the TLBs 126/128 may be updated to include the new entries from the page table 152.

To reduce data access latency further, when CPUs 122/124 perform a read or a write operation to a location within a page, the memory system may access data stored in a small number of consecutive locations that includes the location requested by the CPUs 122/124. For example, in a read operation, the memory system may return data read from a number of consecutive locations of the remote memory 150, comprising a cache-line, to the CPUs 122/124. In a write operation, the memory system may overwrite the existing cache-line data with new cache-line data, generally consisting of multiple bytes of data. The memory system may write the new cache-line data back to the remote memory 150. In one example, the cache-line may have a granularity of 64 bytes (B) so that 64 consecutive bytes of data are accessed from the remote memory 150. In one embodiment, the remote memory 150 or the cache-line may be part of a buffer device such as a CXL device used for high-speed CPU-to-memory connection.

Figure 2:
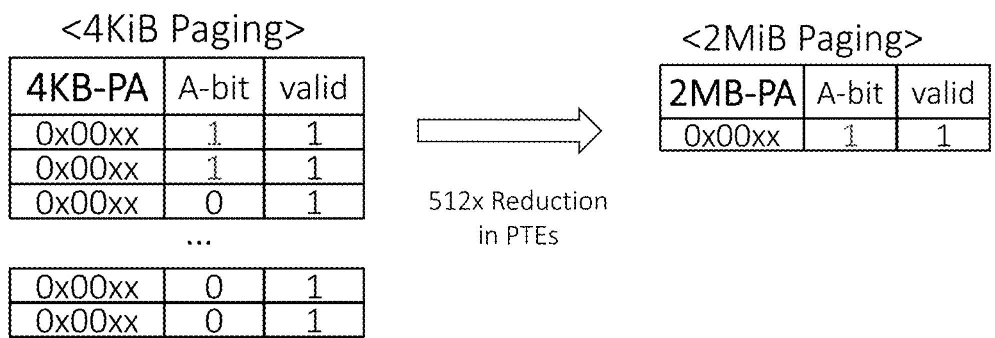
FIG. 2 illustrates a reduction of the number of the entries in a page table when the page size is increased from 4 KB to 2 MB to increase memory performance but at a cost of a reduction in the resolution for discerning whether a memory region is cold or hot in accordance with one aspect of the present disclosure.

As indicated, active tiering management involves the ability to discern hot pages that are frequently accessed by the CPUs 122/124 from cold pages that have not been accessed in a certain time period so that the hot pages may be tiered in the local memory 140 and the cold pages may be tiered in the remote memory 150 or compressed in the compressed memory 160 to free up more memory space for other processes. A flag bit in each entry of the page table 152 may indicate that the page has been accessed by the CPUs 122/124 since the last time the access bit was reset by the CPUs 122/124. To increase memory performance, the granularity of the page in the page table 152 and TLBs 126/128 may be large. In one embodiment, huge-pages allow for a single page table entry to represent a large collection of the common page size of 4 KB, increasing performance by reducing TLB misses and the depth of page table walks FIG. 2 illustrates a reduction of the number of the entries in a page table when the page size is increased from 4 KB to 2 MB to increase memory performance but at a cost of a reduction in the resolution for discerning whether a memory region is cold or hot in accordance with one aspect of the present disclosure. The 2 MB, which is equivalent to 512 4 KB pages, may represent the most common size of a huge-page. In other embodiments, a huge-page may be 1 GB in size, or equivalent to 256K 4 KB pages.

In a page table for 4 KB pages, an access bit of a page table entry may indicate whether the page associated with the entry has been accessed by a connected host within a certain time period, such as since the access bit was last reset by the host. FIG. 2 shows that the first two pages of the page table have their access bits set. These two hot pages may be maintained in a high performance memory tier, while the other pages with their access bits cleared are cold pages that may be demoted to a lower tier memory or compressed.

In the case of the 2 MB huge-page, the page table entry shows the access bit for the page is set because the memory locations corresponding to the first two 4 KB sub-pages have been accessed at least once under an identical host access scenario as the page table for the 4 KB pages. However, the resolution or granularity for discerning whether the huge-page is hot or cold is now at a much coarser 2 MB. If only a few objects in the huge-page are accessed by the host process, such as shown here, the entire huge-page is flagged as hot and remains in a high-performance tier, leading to inefficient memory utilization and increasing the challenge of migration and tiering of page data among the memory hierarchy.

Figure 3:
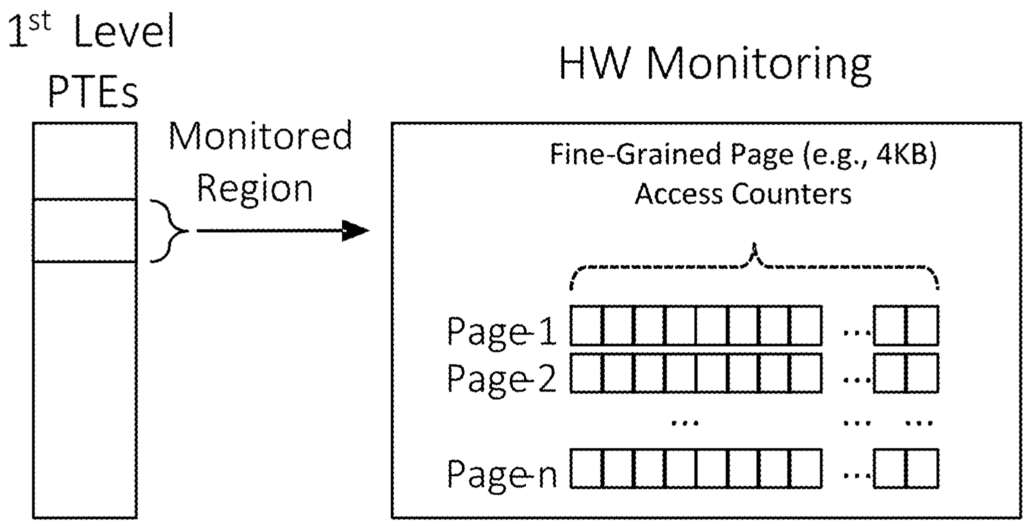
FIG. 3 illustrates a memory buffer that has the capability to track access to a page at a granularity finer than the size of the page to better distinguish between a warm page or a hot page in accordance with one aspect of the present disclosure.

FIG. 3 illustrates a memory buffer that has the capability to track access to a page at a granularity finer than the size of the page to better distinguish between a warm page or a hot page in accordance with one aspect of the present disclosure. The memory buffer may be the local memory 140, the remote memory 150, or the compressed memory 160 of FIG. 1 or parts thereof. In one embodiment, a separate logical structure or interface coupled to the memory buffer may track or monitor finer-granularity access to the local memory 140, remote memory 150, or the compressed memory 160.

In one embodiment, when the huge-page is 2 MB, the 2 MB granularity used by the host in the host-side page table (e.g., page table 152 of FIG. 1) may have the same granularity as a device-side first level page table used for address translation from the host physical address to the device physical address. The device-side first level page table may track access to the 2 MB huge-page at a sub-page granularity of 4 KB. In one embodiment, the host-side page table or the memory buffer may track access to the huge-page at a sub-page granularity with the assistance of logical structure that is within or coupled to the memory buffer but without the assistance of a separate device-side page table. Collectively, these embodiments may be referred to as a first level page table that tracks access by the host process at a finer granularity. This may be the only page table level for uncompressed memory regions (e.g., remote memory 150) and would likely be stored in SRAM. All memory accesses within the memory device may need lookup of the entries in the first level page table. A flag in the first level page table entries may indicate that access to the corresponding 2 MB region of the device memory may be tracked at a finer granularity (e.g., 4 KB) by the device.

In one embodiment, the device may track memory access to each 4 KB sub-page region of the 2 MB huge-page using a counter. A 1-bit counter or an access bit may simply indicate that the 4 KB sub-page has been accessed. An N-bit access counter may provide more information to indicate the number of accesses up to $2^N-1$. In one embodiment, the N-bit access counter may indicate access over the last N time periods with each bit corresponding to access occurring during one of the time periods. In one embodiment, access during each of the time periods may be indicated by multiple bits rather than a single bit. FIG. 3 shows an N-bit access counter for each of the 512 4 KB sub-pages of the 2 MB huge-page. The access counters may increment in parallel with the memory accesses. In one embodiment, the access counters may be collated and stored in device memory, for example, in a cacheable cache-line accessible by the host. In the case of the 64B cache-line of the CXL device discussed earlier, the cache-line may collate and store the 1-bit access counters for the 512 4 KB sub-pages of the 2 MB huge-page. The host may access the cache-line using a CXL.mem or CXL.io operation. In one embodiment, the access counters for multiple 2 MB huge-pages may be co-located within the same 64B cache-line if memory accesses are tracked with a granularity greater than 4 KB. For example, the 1-bit access counters for 8×2 MB huge-pages may be stored in a 64B cache-line if the tracking granularity is 32 KB so that each 2 MB huge-page may generate 64 1-bit access counter values.

Figure 4:
FIG. 4 illustrates a signal flow diagram between a host and a memory buffer for the host to configure the memory buffer to monitor access to a page at a granularity finer than the size of the page in accordance with one aspect of the present disclosure.
Figure 4:
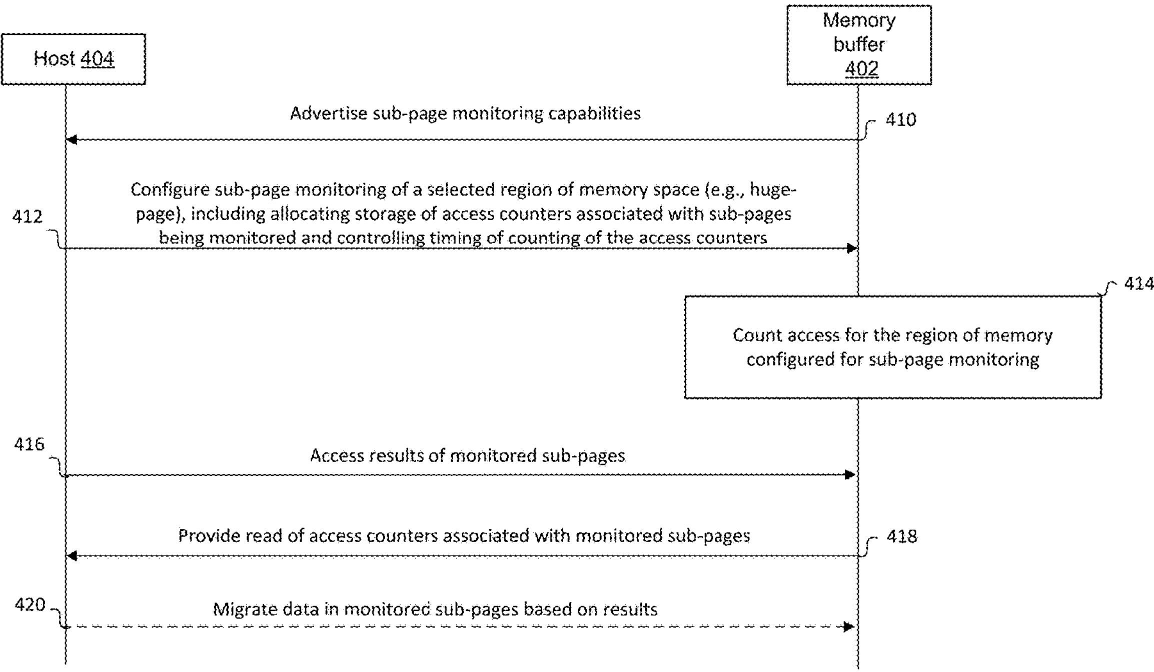

FIG. 4 illustrates a signal flow diagram 400 between a host 404 and a memory buffer 402 for the host 404 to configure the memory device 402 to monitor access to a page at a granularity finer than the size of the page in accordance with one aspect of the present disclosure.

The memory buffer 402 may advertise 410 its sub-page monitoring capabilities. In one embodiment, the advertised capabilities may include the monitoring or tracking granularity (e.g., 4 KB), the number of sub-regions being tracked in a page (e.g., 512 4 KB sub-pages in a 2 MB huge-page), the size of the access counters (e.g., single-bit or multi-bit), and optional timing parameters. In one embodiment, the memory buffer 402 may advertise that certain regions of the memory space are capable of supporting fine-grain monitoring capabilities.

The host 404 may configure 412 a selected portion of its allocated address range for fine-grain monitoring. In one embodiment, the selected address range may be a huge-page when 1-bit access counters are used for fine-grain monitoring or less than a huge-page when multi-bit access counters are used. In one embodiment, the selected address range may remain at a huge-page even when multi-bit access counters are used for fine-grain monitoring. In this case, the host 404 may access more than one cache-line to retrieve all the counter values. The host 404 may allocate storage of the access counters associated with the monitored sub-regions. For example, the host 404 may select a portion of its allocated memory space for counter storage or may request the access counters be at fixed addresses with access controlled by the memory buffer 402.

The host 404 may control timing of the access counters. In one embodiment, the host 404 may clear all access counters via a write of all-zeros to the one or more cache-lines containing the counter values. For example, the host 404 may reset the counter values in the cache-lines using a store command. The host 404 may read the cache-lines after a certain time interval to detect if there has been memory access to the monitored sub-regions since the access counters were cleared. In this way, the host 404 may control the counting time period to free the memory buffer 402 from having to implement timing circuitry.

The memory buffer 402 may count accesses to the region of the memory configured for fine-grain monitoring. The access counter for a sub-region may increment once for every read or write access by the host to the sub-region. When the access counter reaches its maximum, it may stay at its saturated value until cleared by the host 404.

The host 404 may access 416 results of the fine-grain monitoring by reading the storage location containing the access counters. The memory buffer 402 may allow direct access by the host 404 to the access counters via a predefined interface. For example, the host 404 may read the cache-lines using a load command to query the counter values.

The memory buffer 402 may provide 418 the access counters associated with the monitored sub-regions to the host 404. In one embodiment, the memory buffer 402 counter values may be provided through the cache-line that stores the 1-bit access counters for the 512 4 KB sub-pages of a 2 MB huge-page. The cache-line is allocated to the host 404 and accessible by the host 404 using read/write commands such as load/store.

Based on the information provided by the access counter values, the host 404 may identify individual hot or cold sub-pages within the huge-page rather than treating the entire huge-page as hot or cold so as to improve tiering decisions for the huge-page. The host 404 may migrate 420 data in the sub-pages based on the results. In one embodiment, the host 404 may trigger compaction among multiple huge-pages to create separate hot and cold huge-pages. In one embodiment, the host 404 may trigger migration of the huge-page to a higher or lower memory tier.

Figure 5:
FIG. 5 illustrates a signal flow diagram between a host and a memory buffer in which the memory buffer determines how to rearrange data between pages to create separate hot and cold pages based on the results of monitored page access at a granularity finer than the size of the pages in accordance with one aspect of the present disclosure.
Figure 5:
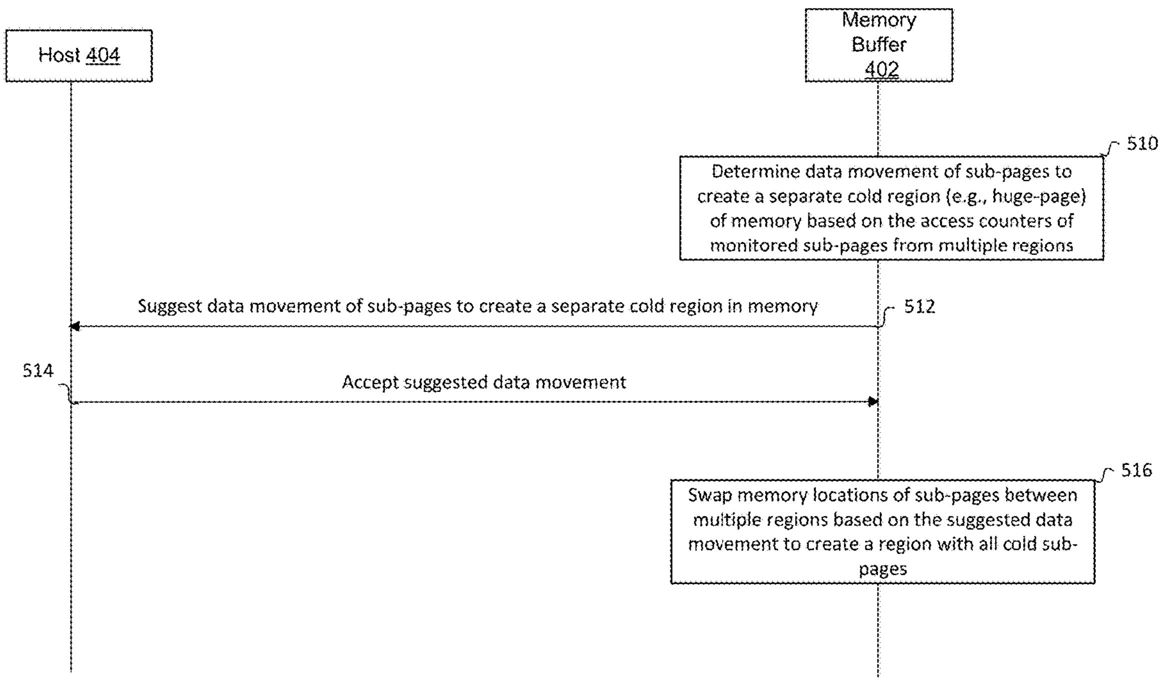

FIG. 5 illustrates a signal flow diagram between a host 404 and a memory buffer 402 in which the memory buffer 402 determines how to rearrange data between pages to create separate hot and cold pages based on the results of monitored page access at a granularity finer than the size of the pages in accordance with one aspect of the present disclosure. FIG. 5 may represent one embodiment of the sub-page data migration operation 420 of FIG. 4.

The memory buffer 402 may determine 510 data movement of sub-pages to create a separate cold region of memory based on the access counters of monitored sub-pages from multiple regions. In one embodiment, the memory buffer 402 may analyze the access statistics from the 512 4 KB sub-pages of multiple 2 MB huge-pages to determine how to move data in the huge-pages to create separate hot and cold huge-pages. For example, if there are N hot sub-pages in a first huge-page and M hot sub-pages in a second huge-page, the memory buffer 402 may determine to swap the N hot sub-pages of the first huge-page with N cold sub-pages of the second huge-page in a compaction operation to create a first new huge-page that is completely cold and a second new huge-page that has N+M hot sub-pages. In one embodiment, the host 404, rather than the memory buffer 402, may analyze the access counters of the monitored sub-pages to determine how to move the sub-pages to create separate hot and cold huge-pages.

The memory buffer 402 may suggest 512 to the host 404 the determined movement of sub-pages to create a separate cold region. The host 404 may accept or reject the suggested sub-page movement.

If the host 404 accepts 514 the suggested sub-page movement, the memory buffer 402 may swap memory locations of sub-pages between multiple regions in the device memory based on the suggested data movement to create a separate region with all cold sub-pages. Thus, the memory buffer 402 may rearrange the sub-pages without sending the sub-pages or the sub-page addresses to the host 404. In one embodiment, the host 404 may enable the sub-page movement by the memory buffer 402 using a vendor-defined message (VDM) to avoid unnecessary data movement to the host 404. In one embodiment, the memory buffer 402 may leverage the device-side cache to swap the memory locations. In one embodiment, the cold huge-page created by the data movement of the compaction operation may be compressed and stored in a compressed memory to free up memory in the memory buffer 402.

Figure 6:
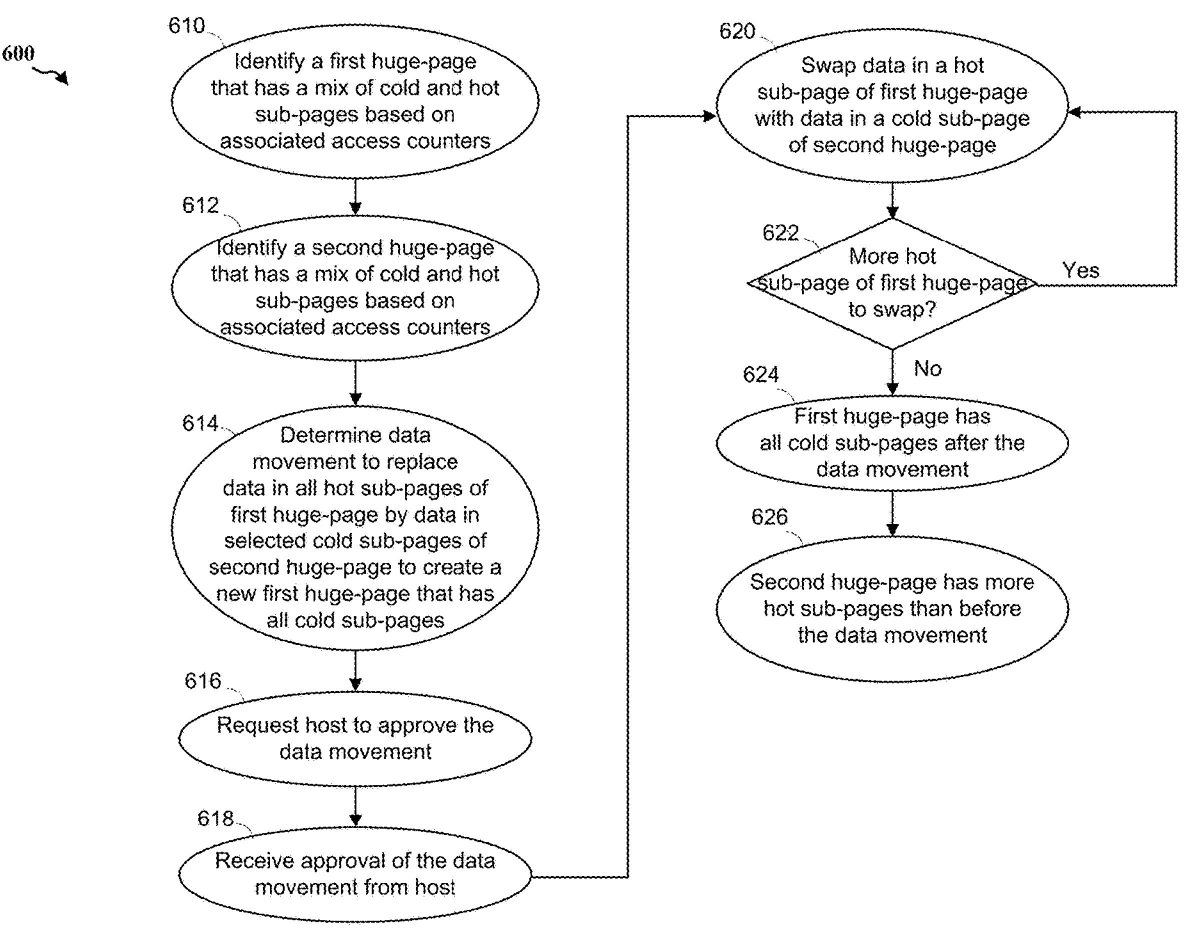
FIG. 6 illustrates a flow diagram of a method for a memory buffer to move data between two warm pages to create separate cold and hot pages based on the results of monitored page access at a granularity finer than the size of the pages in accordance with one aspect of the present disclosure.

FIG. 6 illustrates a flow diagram of a method 600 for a memory buffer to move data between two warm pages to create separate cold and hot pages based on the results of monitored page access at a granularity finer than the size of the pages in accordance with one aspect of the present disclosure. In one aspect, the method 600 may be performed by the remote memory 150 of FIG. 1, or the device 402 of FIG. 4 or FIG. 5, utilizing hardware, software, or combinations of hardware and software.

In operation 610, the memory buffer may identify a first huge-page that has a mixture of cold and hot sub-pages based on the access counters associated with the sub-pages.

In operation 612, the memory buffer may identify a second huge-page that has a mixture of cold and hot sub-pages based on the access counters associated with the sub-pages.

In operation 614, the memory buffer may determine proposed data movement to replace data in all hot sub-pages of the first huge-page by data in selected cold sub-pages of the second huge-page to create a new first huge-page that has all cold sub-pages.

In operation 616, the memory buffer may request the host to approve the proposed data movement.

In operation 618, the memory buffer may receive approval of the proposed data movement from the host.

In operation 620, the memory buffer may swap data in a hot sub-page of the first huge-page with data in a cold sub-page of the second huge-page.

In operation 622, the memory buffer may determine if there is at least one more hot sub-page of the first huge-page to swap.

If the first huge-page has at least one more hot sub-page to swap, the memory buffer may repeat operation 620 until there are no more hot sub-pages to swap.

Once all the hot sub-pages in the first huge-page have been swapped with cold sub-pages in the second huge-page, in operation 624, the first huge-page has all cold sub-pages.

In operation 626, the second huge-page has more hot sub-pages than before the data movement.

Figure 7:
FIG. 7 illustrates a signal flow diagram between a host and a memory buffer to compress sub-pages of a page as separately compressible entities based on the results of monitored page access at a granularity finer than the size of the page in accordance with one aspect of the present disclosure.
Figure 7:
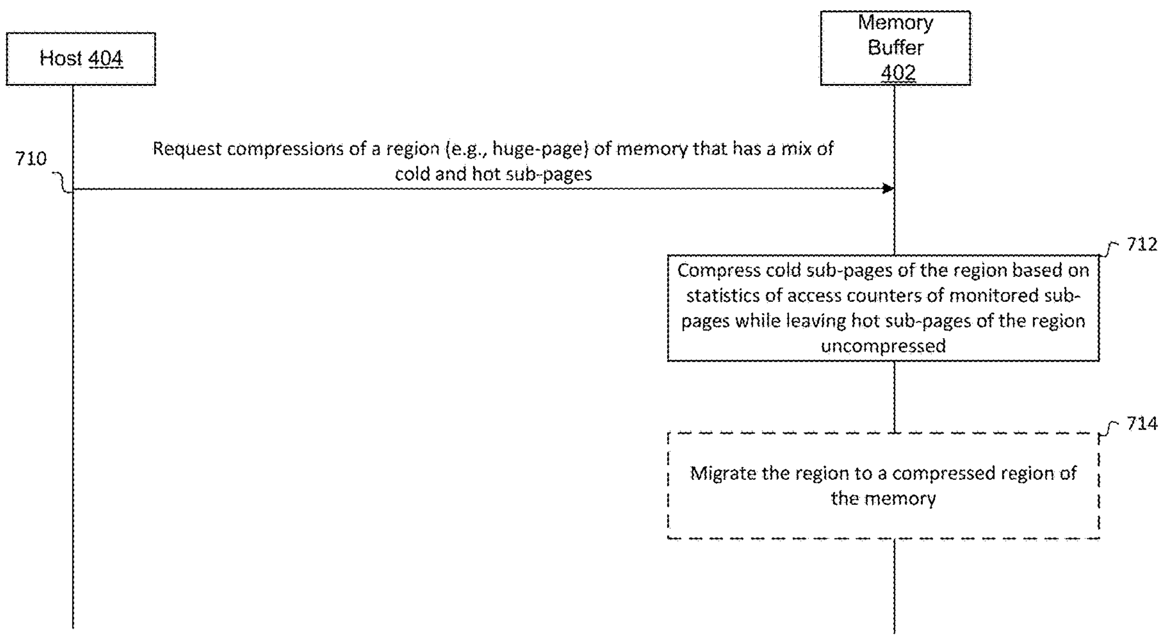

FIG. 7 illustrates a signal flow diagram between a host 404 and a memory buffer 402 to compress sub-pages of a page as separately compressible entities based on the results of monitored page access at a granularity finer than the size of the page in accordance with one aspect of the present disclosure. FIG. 7 may represent one embodiment of the sub-page data migration operation 420 of FIG. 4.

The host 404 may send a request 710 to the memory buffer 402 to compress a region of memory that has a mixture of cold and hot sub-pages. In one embodiment, the host 404 may analyze the access statistics from the 512 4 KB sub-pages of multiple 2 MB huge-pages to identify a "mostly cold" huge-page that may be compressed. In one embodiment, the memory buffer 402 may analyze the access statistics to identify a candidate huge-page for compression. The memory buffer 402 may then suggest the candidate huge-page for compression to the host 404 for approval. In one embodiment, after identification of the huge-page the host 404 or the memory buffer 402 as a candidate for compression, the host 404 or the memory buffer 402 may further select specific cold sub-pages within the candidate huge-page for compression based on the values of the access counters. In one embodiment, the host 404 may send a vendor-defined message (VDM) to the memory buffer 402 to request compression of a huge-page of device memory whose sub-page access tracking is enabled.

The memory buffer 402 may compress 712 cold sub-pages of the region based on statistics of the access counters of the monitored sub-pages while leaving hot sub-pages of the region uncompressed. In one embodiment, the memory buffer 402 may compress all cold sub-pages within the 2 MB huge-page. Warm or hot sub-pages within the compressed 2 MB block may remain uncompressed. However, access to the uncompressed sub-pages in the huge-page may incur the additional latency of a second level page table entry access.

Thus, the host 404 may manage a single page table entry for the huge-page and leverage device-side page tables to treat each 4 KB sub-page of the huge-page as a separately compressible entity. Advantageously, the host 404 may retain the performance benefit of the huge-pages while optimizing memory usage via compression. As a result, a "mostly cold" huge-page may be compressed without adding significant latency to warm or hot sub-pages.

The memory buffer 402 may migrate 714 the compressed region to a compressed tier of the memory hierarchy to free up memory in the memory buffer 402. In one embodiment, the compressed region may remain in the memory buffer 402.

Figure 8:
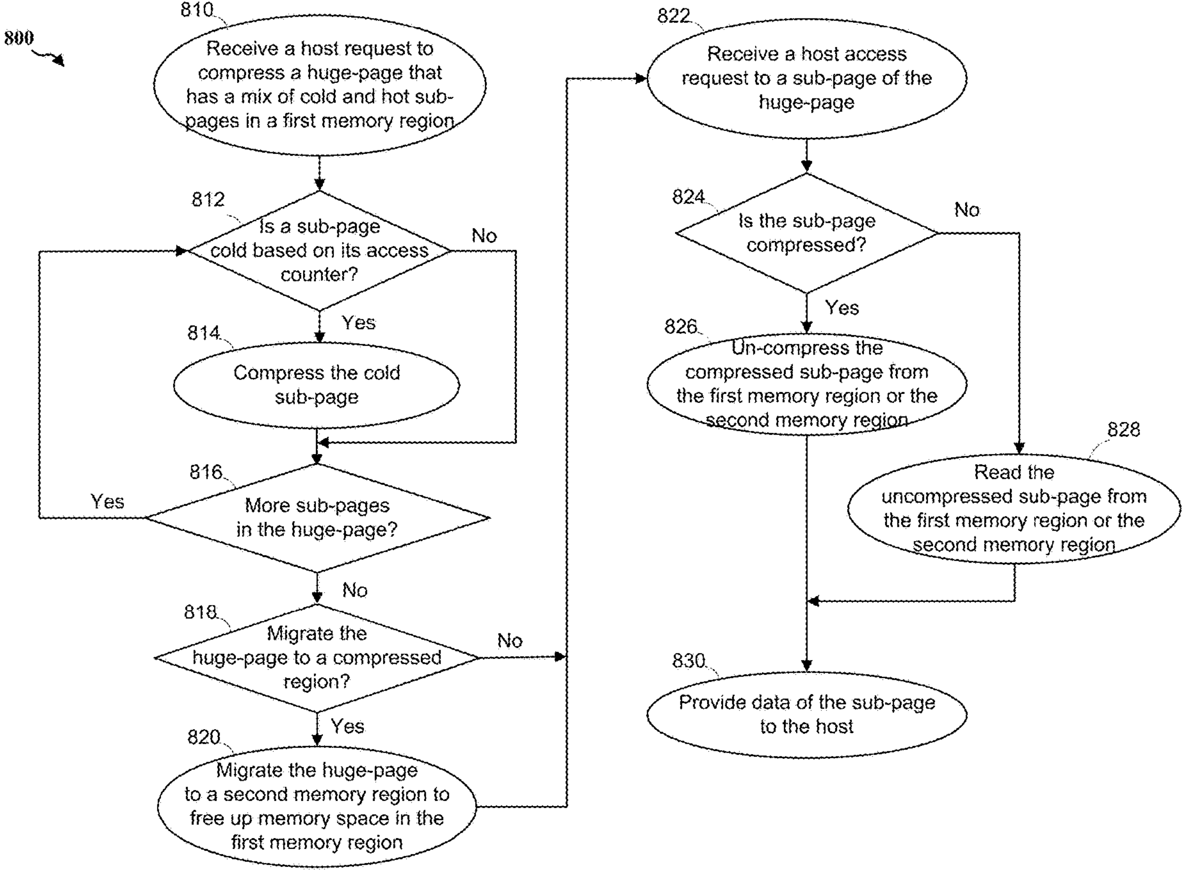
FIG. 8 illustrates a flow diagram of a method for a memory buffer to compress sub-pages of a page as separately compressible entities based on monitoring page access at a granularity finer than the size of the page and to respond to host requests for page data in accordance with one aspect of the present disclosure.

FIG. 8 illustrates a flow diagram of a method 800 for a memory buffer to compress sub-pages of a page as separately compressible entities based on monitoring page access at a granularity finer than the size of the page and to respond to host requests for page data in accordance with one aspect of the present disclosure. In one aspect, the method 800 may be performed by the remote memory 150 of FIG. 1, or the device 402 of FIG. 4 or FIG. 7, utilizing hardware, software, or combinations of hardware and software.

In operation 810, the memory buffer may receive a host request to compress a huge-page that has a mixture of cold and hot sub-pages in a first memory region.

In operation 812, the memory buffer may determine if a sub-page is cold based on its access counter.

If the sub-page is cold, in operation 814, the memory buffer may compress the cold sub-page. Otherwise, if the sub-page is not cold (e.g., warm or hot), the sub-page may remain uncompressed.

In operation 816, the memory buffer may determine if there is any more sub-page within the huge-page to assess whether the sub-page is cold.

If there is at least one more sub-page to assess, the device may repeat operation 812 until all sub-pages have been assessed.

In operation 818, the memory buffer may determine whether to migrate the huge-page to a compressed region of the memory space.

If the huge-page is to be migrated, in operation 820, the memory buffer may migrate the huge-page to a second memory region to free up memory space in the first memory region.

In operation 822, the memory buffer may receive a host access request to a sub-page of the huge-page.

In operation 824, the memory buffer may determine if the requested sub-page is compressed.

If the requested sub-page is compressed, in operation 826, the memory buffer may un-compress the compressed sub-page from the first memory region or the second memory region.

If the requested sub-page is not compressed, in operation 828, the memory buffer may read the uncompressed sub-page from the first memory region or the second memory region.

In operation 830, the memory buffer may provide data of the sub-page to the host.

Figure 9:
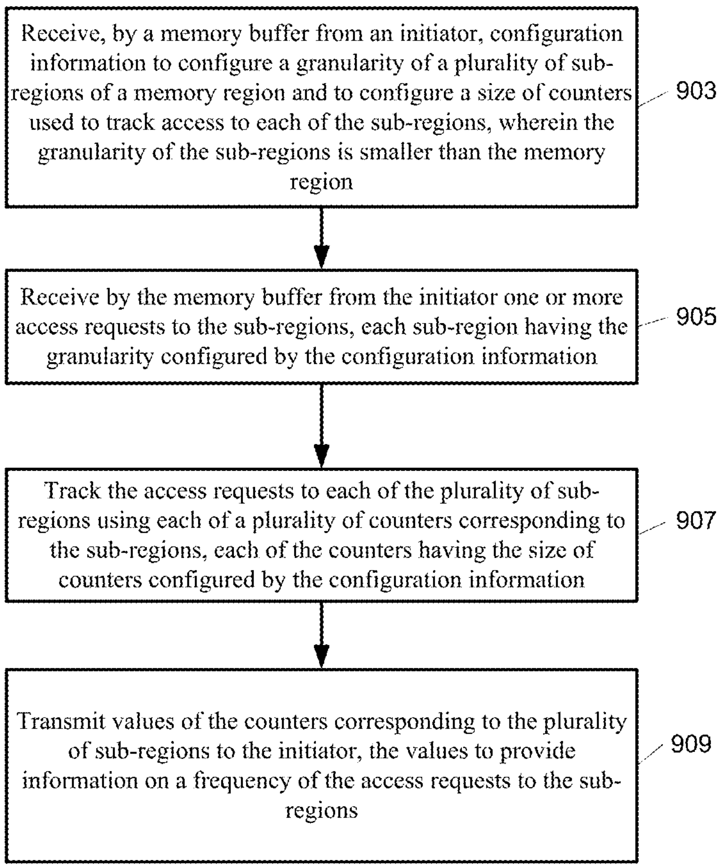
FIG. 9 illustrates a flow diagram of a method for a memory buffer to track access to a region of the memory at a granularity finer than the size of the memory region as configured by an initiator and to provide the tracked results to the initiator in accordance with one aspect of the present disclosure.

FIG. 9 illustrates a flow diagram of a method 900 for a memory buffer to track access to a region of the memory at a granularity finer than the size of the memory region as configured by an initiator and to provide the tracked results to the initiator in accordance with one aspect of the present disclosure. In one embodiment, the initiator may be the host 120 of FIG. 1 or the host of FIG. 4. In one aspect, the method 900 may be performed by the local memory 140 or remote memory 150 of FIG. 1, or the memory buffer 402 of FIG. 4, utilizing hardware, software, or combinations of hardware and software.

In operation 903, the memory buffer may receive from an initiator configuration information to configure a granularity of a plurality of sub-regions of a memory region and to configure a size of counters used to track access to each of the sub-regions. The granularity of the sub-regions is smaller than the memory region. In one embodiment, the memory buffer may advertise its capabilities to track access to the memory region at a granularity smaller than the memory region. In one embodiment, the configured granularity of the sub-regions may be the same as or greater than the granularity of the sub-regions advertised by the memory buffer. In one embodiment, the configuration information may include allocated location for storing the values of the counters used to track the access. The allocated location is accessible by the initiator.

In operation 905, the memory buffer may receive from the initiator one or more access requests to the sub-regions. Each sub-region may have the granularity configured by the configuration information. In one embodiment, the memory buffer may receive from the initiator a write access to the allocated location that stores the counters to clear all the counters.

In operation 907, the memory buffer may track the access requests to each of the plurality of sub-regions using each of a plurality of counters corresponding to the sub-regions. Each of the counters may have the size of counters configured by the configuration information. In one embodiment, the memory buffer may increment the counter corresponding to a sub-region for every read or write access request by the initiator to the sub-region. When the counter reaches its maximum, it may stay at its saturated value until cleared by the initiator.

In operation 909, the memory buffer may transmit values of the counters corresponding to the sub-regions to the initiator, the values providing information on a frequency of the access requests to the sub-regions. In one embodiment, the counters may indicate that a sub-region has not been accessed by the initiator (e.g., a cold sub-region), has been accessed once by the initiator (e.g., a warm sub-region), or has been accessed multiple times by the initiator (e.g., a hot sub-region). In one embodiment, based on the information regarding access requests to the plurality of sub-regions, the sub-regions may be migrated to create a memory region that is cold, or may be migrated to a different part of the memory region.

Various aspects of the techniques for a memory system to track access requests to a memory region at a granularity finer than the granularity of the memory region described herein may include various operations. These operations may be performed and/or controlled by hardware components, digital hardware and/or firmware/programmable registers (e.g., as implemented in computer-readable medium), and/or combinations thereof. The methods and illustrative examples described herein are not inherently related to any particular device or other apparatus. Various systems (e.g., such as a finite-state-machine (FSM)) may be used in accordance with the teachings described herein, or it may prove convenient to construct more specialized apparatus to perform the required method steps. The required structure for a variety of these systems will appear as set forth in the description above.

In one embodiment, the memory system may include a memory buffer and some logic. The memory buffer may be synchronous dynamic random access memory (DRAM), static random access memory (SRAM), memory module of DRAM/SRAM, or other types of storage devices. The logic may be access counters used to keep track of access to sub-regions of the memory buffer. In one embodiment, logic may be provided by a state machine or one or more general-purpose processing devices such as a microprocessor, central processing unit, or the like. In an illustrative example, processing device may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Logic may also comprise one or more special-purpose processing devices such as an application specific integrated circuit (ASIC), a field programmable gate array (FPGA), a digital signal processor (DSP), network processor, or the like. The logic may be configured to execute the operations described herein, in accordance with one or more aspects of the present disclosure, for performing the operations and steps discussed herein.

A computer-readable medium used to implement operations of various aspects of the disclosure may be non-transitory computer-readable storage medium that may include, but is not limited to, electromagnetic storage medium, magneto-optical storage medium, read-only memory (ROM), random-access memory (RAM), erasable programmable memory such as erasable programmable read-only memory and electrically erasable programmable read-only memory, (e.g., EPROM and EEPROM), flash memory, or another now-known or later-developed non-transitory type of medium that is suitable for storing configuration information.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "may include", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing. For example, certain operations may be performed, at least in part, in a reverse order, concurrently and/or in parallel with other operations.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component.

Additionally, "configured to" or "configurable to" can include generic structure (e.g., generic circuitry) that is manipulated by firmware (e.g., an FPGA) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A memory buffer comprising:

an interface configured to:

receive, from an initiator, configuration information to configure a granularity of each sub-region of a plurality of sub-regions of a memory region and to configure a size of counters used to track access to each sub-region of the plurality of the sub-regions, wherein the granularity of each sub-region of the plurality of the sub-regions is smaller than a granularity of the memory region; and receive, from the initiator, one or more access requests to sub-regions of the plurality of sub-regions, each sub-region of the plurality of sub-regions having the granularity configured by the configuration information; and a plurality of counter circuits each having the size of counters configured by the configuration information to track the one or more access requests to each of the plurality of sub-regions; and a circuit coupled to the interface, wherein the interface is further configured to:

transmit, to the initiator, values of the counter circuits corresponding to the plurality of sub-regions, wherein the values of the counter circuits provide information on a frequency of the one or more access requests to each of the sub-regions of the plurality of sub-regions;

wherein the circuit is configured to:

modify one or more sub-regions of the memory region based on the values of the counter circuits corresponding to the sub-regions by determining proposed data movement of selected sub-regions among a plurality of memory regions to create a memory region that is cold based on the values of the counter circuits corresponding to the sub-regions of the plurality of memory regions and moving the selected sub-regions among the plurality of memory regions to create the memory region that is cold based on the values of the counter circuits corresponding to the sub-regions.

2. The memory buffer of claim 1, wherein the configuration information comprises a location of the memory buffer for storing the values of the counter circuits.

3. The memory buffer of claim 1, wherein the interface is further configured to:

receive, from the initiator, a command to clear the counter circuits corresponding to the sub-regions.

4. The memory buffer of claim 3, wherein the values of the counter circuits corresponding to sub-regions indicate a number of access requests to the corresponding sub-regions since the counter circuits are cleared by the initiator.

5. The memory buffer of claim 1, wherein the interface is further configured to advertise capabilities of the memory buffer to track access to the plurality of sub-regions at a granularity smaller than the memory region, wherein the capabilities advertised comprise one or more of:

a smallest granularity that access to the sub-regions of the memory region is tracked;

a maximum number of the sub-regions of the memory region; or a maximum size of the counters used to track access to the sub-regions.

6. The memory buffer of claim 5, wherein the granularity of the sub-regions configured by the configuration information received from the initiator is the same as or greater than the smallest granularity advertised by the memory buffer.

7. The memory buffer of claim 1, wherein the interface is further configured to:

transmit the proposed data movement to the initiator for acceptance; and receive, from the initiator, an acceptance of the proposed data movement.

8. The memory buffer of claim 7, wherein the proposed data movement comprises a swap of selected sub-regions of a first memory region with selected sub-regions of a second memory region that are cold based on the values of the counter circuits corresponding to the sub-regions.

9. The memory buffer of claim 1, wherein the interface is further configured to:

receive, from the initiator, a request to compress the memory region;

and wherein the circuit is further configured to:

selectively compress the sub-regions based on the values of the counter circuits corresponding to the sub-regions.

10. A method of operation in a memory buffer, comprising:

receiving, from an initiator, configuration information to configure a granularity of each sub-region of a plurality of sub-regions of a memory region and to configure a size of counters used to track access to each sub-region of the plurality of sub-regions, wherein the granularity of each sub-region of the plurality of sub-regions is smaller than a granularity of the memory region;

receiving, from the initiator, one or more access requests to sub-regions of the plurality of sub-regions, each sub-region of the plurality of sub-regions having the granularity of each sub-region of the plurality of sub-regions configured by the configuration information;

tracking the one or more access requests to each of the plurality of sub-regions using each of a plurality of counters corresponding to the sub-regions, each of the counters having the size of counters configured by the configuration information; and transmitting values of the counters corresponding to the plurality of sub-regions to the initiator, the values of the counter circuits provide information on a frequency of the one or more access requests to each of the sub-regions of the plurality of sub-regions;

modifying one or more sub-regions of the memory region based on the values of the counter circuits corresponding to the sub-regions by determining proposed data movement of selected sub-regions among a plurality of memory regions to create a memory region that is cold based on the values of the counter circuits corresponding to the sub-regions of the plurality of memory regions and moving the selected sub-regions among the plurality of memory regions to create the memory region that is cold based on the values of the counter circuits corresponding to the sub-regions.

11. The method of claim 10, wherein the configuration information comprises a location of the memory buffer for storing the values of the counters.

12. The method of claim 10, further comprising:

receiving, by the memory buffer from the initiator, a command to clear the counters corresponding to the sub-regions.

13. The method of claim 12, wherein the values of the counters corresponding to sub-regions indicate a number of access requests to the corresponding sub-regions since the counters are cleared by the initiator.

14. The method of claim 10, further comprising:

advertising capabilities of the memory buffer to track access to the plurality of sub- regions at a granularity smaller than the memory region;

wherein the capabilities advertised comprise one or more of:

a smallest granularity that access to the sub-regions of the memory region is tracked;

a maximum number of the sub-regions of the memory region; or a maximum size of the counters used to track access to the sub-regions.

15. The method of claim 14, wherein the granularity of the sub-regions configured by the configuration information received from the initiator is the same as or greater than the smallest granularity advertised by the memory buffer.

16. The method of claim 10, further comprising:

transmitting, to the initiator, the proposed data movement to the initiator for acceptance;

receiving, from the initiator, an acceptance of the proposed data movement.

17. The method of claim 16, wherein the proposed data movement comprises:

swapping selected sub-regions of a first memory region with selected sub-regions of a second memory region that are cold based on the values of the counters corresponding to the sub-regions.

18. The method of claim 10, further comprising:

receiving, by the memory buffer from the initiator, a request to compress the memory region; and selectively compressing the sub-regions based on the values of the counters corresponding to the sub-regions.

19. A non-transitory computer-readable medium having instructions stored therein, which when executed by a processor, cause the processor to perform operations, the operations comprising:

receiving, from an initiator, configuration information to configure a granularity of each sub-region of a plurality of sub-regions of a memory region and to configure a size of counters used to track access to each sub-region of the plurality of sub-regions, wherein the granularity of each sub-region of the plurality of sub-regions is smaller than a granularity of the memory region;

receiving, from the initiator, one or more access requests to sub-regions of the plurality of sub-regions, each sub-region of the plurality of sub-regions having the granularity of each sub-region of the plurality of sub-regions configured by the configuration information;

tracking the one or more access requests to each of the plurality of sub-regions using each of a plurality of counters corresponding to the sub-regions, each of the counters having the size of counters configured by the configuration information;

transmitting values of the counters corresponding to the plurality of sub-regions to the initiator, the values of the counter circuits provide information on a frequency of the one or more access requests to each of the sub-regions of the plurality of sub-regions; and modifying one or more sub-regions of the memory region based on the values of the counter circuits corresponding to the sub-regions by determining proposed data movement of selected sub-regions among a plurality of memory regions to create a memory region that is cold based on the values of the counter circuits corresponding to the sub-regions of the plurality of memory regions and moving the selected sub-regions among the plurality of memory regions to create the memory region that is cold based on the values of the counter circuits corresponding to the sub-regions.

* * * * *